US012563357B2

(12) United States Patent
Armstrong et al.

(10) Patent No.: US 12,563,357 B2
(45) Date of Patent: Feb. 24, 2026

(54) METHOD AND SYSTEM FOR GENERATING A PERSONALISED HEAD-RELATED TRANSFER FUNCTION

(71) Applicant: Sony Interactive Entertainment Europe Limited, London (GB)

(72) Inventors: Calum Armstrong, London (GB); Danjeli Schembri, London (GB); Michael Lee Jones, London (GB); Christopher George Buchanan, London (GB); Nima Karshenas, London (GB)

(73) Assignee: Sony Interactive Entertainment Europe Limited

( * ) Notice: Subject to any disclaimer, the term of this patent is extended or adjusted under 35 U.S.C. 154(b) by 77 days.

(21) Appl. No.: 18/529,078

(22) Filed: Dec. 5, 2023

(65) Prior Publication Data

US 2024/0187809 A1 Jun. 6, 2024

(30) Foreign Application Priority Data

Dec. 5, 2022 (GB) ...................................... 2218264

(51) Int. Cl.
*H04S 7/00* (2006.01)

(52) U.S. Cl.
CPC ................ *H04S 7/302* (2013.01); *H04S 7/40* (2013.01); *H04S 2400/11* (2013.01); *H04S 2420/01* (2013.01)

(58) Field of Classification Search
CPC ... H04S 7/30; H04S 7/302; H04S 7/40; H04S 2400/11; H04S 2420/01
(Continued)

(56) References Cited

U.S. PATENT DOCUMENTS 6,181,800 B1 1/2001 Lambrecht
6,768,798 B1 7/2004 Dempsey
(Continued)

OTHER PUBLICATIONS

Combined Search and Examination Report for Application No. GB2218264.6 dated Jun. 7, 2023. 7 pgs.
(Continued)

*Primary Examiner* — Paul Kim
(74) *Attorney, Agent, or Firm* — Fish & Richardson P.C.

(57) ABSTRACT

An audio personalisation method for generating a personalised Head-Related Transfer Function, HRTF, the method comprising the steps of: obtaining a base HRTF model comprising a first set of parameters; outputting a sound from a virtual sound source according to the base HRTF model, the virtual sound source having an intended virtual position; receiving at least one user indication corresponding to a user virtual position of the virtual sound source, wherein the intended virtual position is different to the user virtual position; updating the first set of parameters to a second set of parameters based on the at least one indication from the user so as to update the user virtual location; and generating a personalised HRTF model comprising the second set of parameters, wherein the difference between the intended virtual position and the user virtual position according to the personalised HRTF model is less than the difference between the intended virtual position and the user virtual position according to the base HRTF model.

18 Claims, 7 Drawing Sheets

(58) Field of Classification Search
USPC .......................................................... 381/303
See application file for complete search history.

(56) References Cited

U.S. PATENT DOCUMENTS

| | | | |
|---|---|---|---|
| 9,848,273 | B1 | 12/2017 | Helwani et al. |
| 2020/0045491 | A1 | 2/2020 | Robinson et al. |
| 2021/0076150 | A1 | 3/2021 | Ithapu et al. |
| 2021/0127223 | A1 * | 4/2021 | Mohapatra ............ G06F 3/0482 |

OTHER PUBLICATIONS

Xie, B. "Head-Related Transfer Function and Virtual Auditory Display," (Chapter 3: Primary Features of HRTFs) J. Ross Publishing, Jul. 2013. ProQuest Ebook Central, pp. 73-107.

* cited by examiner

METHOD AND SYSTEM FOR GENERATING A PERSONALISED HEAD-RELATED TRANSFER FUNCTION

CROSS-REFERENCE TO RELATED APPLICATIONS

The present application claims priority from United Kingdom Patent Application No. 2218264.6, filed Dec. 5, 2022, the disclosure of which is hereby incorporated herein by reference.

FIELD OF THE INVENTION

The following disclosures relate to methods and systems for generating a personalised Head-Related Transfer Function (HRTF).

BACKGROUND

HRTFs (Head Related Transfer Functions) describe the way in which a person hears sound in 3D, and can change depending on the position of the sound source. Typically, in order to calculate a received sound y(f, t), a signal x(f, t) transmitted by the sound source is combined with (e.g. multiplied by, or convolved with) the transfer function H(f).

HRTFs are individual to each person and depend on factors such as the size of the head and shape of the ear. In 3D audio rendering, it is beneficial to try and personalise the HRTF filters used to best match the person listening to the audio. For example, this can mean that the person will hear audio rendered through headphones in a similar way to how they hear 3D audio in real life.

Prior art systems aimed to provide customisation of a HRTF for a specific user by providing a limited number of pre-set HRTFs, each of which provides a different perceived height of the audio sound source, and the user can select a most suitable one. However, the extent of personalisation of the model can be limited and requires decision making from the user to select the closest pre-set HRTF model suited to them.

Alternative prior art systems require the user to input information such as a head measurement, an ear measurement and/or a height measurement. Providing such data is a cumbersome process and can be challenging to obtain, particularly when a single user is required to obtain these measurements on themselves. The system would then use this data to automatically generate an HRTF. The generated HRTF for the specific user cannot be adjusted once generated, resulting in the need to upload new measurements by the user if they are unsatisfied with the generated HRTF.

Accordingly, it is desirable to provide a way of updating a HRTF model such that it is accurately personalised for an individual user, without requiring the input of various data about the user.

SUMMARY OF INVENTION

According to a first aspect, the present disclosure provides an audio personalisation method for generating a personalised Head-Related Transfer Function, HRTF, the method comprising: obtaining a base HRTF model comprising a first set of parameters; outputting a sound from a virtual sound source according to the base HRTF model, the virtual sound source having an intended virtual position; receiving at least one user indication corresponding to a user virtual position of the virtual sound source, wherein the intended virtual position is different to the user virtual position; updating the first set of parameters to a second set of parameters based on the at least one indication from the user so as to update the user virtual location; and generating a personalised HRTF model comprising the second set of parameters, wherein the difference between the intended virtual position and the user virtual position according to the personalised HRTF model is different to the difference between the intended virtual position and the user virtual position according to the base HRTF model.

Throughout the disclosure, a reference to a user virtual position is understood to refer to a virtual position that is related to the user in some way. In some examples, the user virtual position can be thought of as a perceived virtual position. In this case, a perceived virtual position is the position at which the user believes the virtual sound source is coming from. In other examples, the user virtual position can be thought of as a desired virtual position. In this case, a desired virtual position is the position at which the user would like the virtual sound source to come from, for example to match corresponding graphics.

For ease of discussion, the following disclosure will be based on the idea of a user perceived virtual position. However, it will be appreciated that the discussion can equally apply to a user desired virtual position.

In some examples, the difference between the intended virtual position and the user virtual position according to the personalised HRTF model is less than the difference between the intended virtual position and the user virtual position according to the base HRTF model. This may generally be the case when the user virtual position is a user perceived virtual position. However, this may also apply when the user virtual position is a user desired virtual position.

In other examples, the difference between the intended virtual position and the user virtual position according to the personalised HRTF model is greater than the difference between the intended virtual position and the user virtual position according to the base HRTF model. This may generally be the case when the user virtual position is a user desired virtual position. However, this may also apply when the user virtual position is a user perceived virtual position.

The location of the virtual sound source as perceived by a user is likely to differ from the intended location of the virtual sound source. This is because our perceived location of a sound source is influenced by several factors (such as ear shape, head width etc. . . . ) which are different for each person. As such, by receiving an indication of a perceived location of the sound source from an individual user, the personalised HRTF model generated is more accurate than a personalised model generated based on a selection of HRTF model by an individual user. This method increases the accuracy with which the personalised HRTF model represents the user's natural experience of listening to audio in a three-dimensional environment.

The HRTF model has a parametric description of an HRTF i.e. the model comprises a set of parameters each of which indicates one or more of an amplitude of a component audio filter in the HRTF, a Boolean existence of feature, a frequency value, a width of notch etc. . . . . These parameters may indicate the set of component audio filter required to generate the personalised HRTF. Moreover, by storing the HRTF models as sets of parameters it becomes unnecessary to include frequency spectra in the models, thereby reducing the data size and computational complexity of the models.

The intended virtual position may comprise an intended virtual lateral position and the perceived virtual position may comprise a perceived virtual lateral position, and wherein the difference between the intended virtual lateral position and the perceived virtual lateral position according to the personalised HRTF model may be less than the difference between the intended virtual lateral position and the perceived virtual lateral position according to the base HRTF model.

Therefore, in the generated personalised HRTF model, the perceived location of the sound source in the horizontal plane (i.e. the lateralisation) is adjusted to closer match the intended lateral position of the sound source, thereby creating a more accurate perceived location of the sound source in this plane.

The intended virtual position may comprise an intended virtual elevation position and the perceived virtual position may comprise a perceived virtual elevation position, and wherein the difference between the intended virtual elevation position and the perceived virtual elevation position according to the personalised HRTF model may be less than the difference between the intended virtual elevation position and the perceived virtual elevation position according to the base HRTF model.

Therefore, in the generated personalised HRTF model, the perceived location of the sound source in the vertical direction is adjusted to closer match the intended elevation of the sound source, thereby creating a more accurate perceived location of the sound source in the vertical direction.

The base HRTF model can be adjusted in more than one dimension allowing for the perceived virtual location of a sound source to be accurately matched with an intended virtual location of the sound source.

The step of updating the first set of parameters to the second set of parameters may comprise at least one of: adding a parameter to the first set of parameters to generate the second set of parameters; removing a parameter from the first set of parameters to generate the second set of parameters; and modifying a parameter of the first set of parameters to generate the second set of parameters.

The step of updating the first set of parameters to the second set of parameters may comprise incrementally updating the first set of parameters n times to an nth set of parameters, wherein the nth set of parameters becomes the second set of parameters.

In other words, updating the first set of parameters n times to an nth set of parameters can be thought of as producing a series of sets of parameters wherein each subsequent set of parameters in the series corresponds to the previous set of parameters updated as indicated by the user. For example, a first set of parameters is updated to a second set of parameters, the second set of parameters is updated to a third set of parameters, and so on until the nth set of parameters is produced. This nth set of parameters, which may also be referred to as the final set of parameters, can be set as the second set of parameters because it is this final set of parameters that is used to generate the personalised HRTF model.

The method wherein a plurality of user indications may be received and wherein each incremental update of the first set of parameters may be based on a respective user indication from the plurality of user indications.

Multiple updates of the first set of parameters to reach a second set of parameters means the user can fine-tune the HRTF model to reach a more accurate personalised HRTF model. In this way, the perceived location of the sound source closely matches the intended location of the sound source for the user.

The method wherein a parameter of at least one of the said sets of parameters may comprise: an interaural time delay; an interaural level difference; and a first pinna notch.

The step of updating the first set of parameters to the second set of parameters may comprise updating at least one of the interaural time delay or the interaural level difference, in order to reduce a difference between the intended virtual lateral position and the perceived virtual lateral position.

Since the interaural time delay and the interaural level difference are associated with the perceived lateralisation a sound source, these parameters may be updated in order to move the perceived virtual location closer to the intended location in the horizontal plane. Other parameters may also be updated to achieve this effect.

The step of updating the first set of parameters to the second set of parameters may comprise updating the first pinna notch, in order to reduce a difference between the intended virtual elevation position and the perceived virtual elevation position.

The first pinna notch is associated with the perceived height of a sound source. This parameter may be updated in order to move the perceived virtual location closer to the intended location along the vertical axis. Other parameters may also be updated to achieve this effect.

The step generating a personalised HRTF model may comprise selecting a HRTF model from a database of HRTF models. Using a database of models to generate the personalised HRTF model reduces the computational power required of a system.

The step of generating a personalised HRTF model may comprise synthesising the personalised HRTF model in real-time. Generating the HRTF in real-time increases the accuracy of the personalisation since the generated HRTF is not limited to a discrete set of HRTF models and is therefore closer matched to the individual user's experience of 3D sound.

The method may further comprise communicating, to the user, the intended virtual position of the virtual sound source. Communicating the intended virtual position may comprise displaying, for example on a display screen, the virtual sound source at the intended virtual position. Communicating the intended location to a user aids the user in visualising this location such that the input they provide is more accurate.

According to a second aspect, the present disclosure provides a system configured to perform the method of any preceding claim, the system comprising: a HRTF generator configured to: obtain a base HRTF model comprising a first set of parameters; output a sound from a virtual sound source according to the base HRTF model, the virtual sound source having an intended virtual position; receive at least one user indication corresponding to a perceived virtual position of the virtual sound source, wherein the intended virtual position is different to the perceived virtual position; update the first set of parameters to a second set of parameters based on the at least one indication from the user so as to update the perceived virtual location; and generate a personalised HRTF model comprising the second set of parameters, wherein the difference between the intended virtual position and the perceived virtual position according to the personalised HRTF model is less than the difference between the intended virtual position and the perceived virtual position according to the base HRTF model.

The system may further comprise a displaying unit configured to display the virtual sound source to a user at an intended virtual location.

DETAILED DESCRIPTION

Figure 1A:
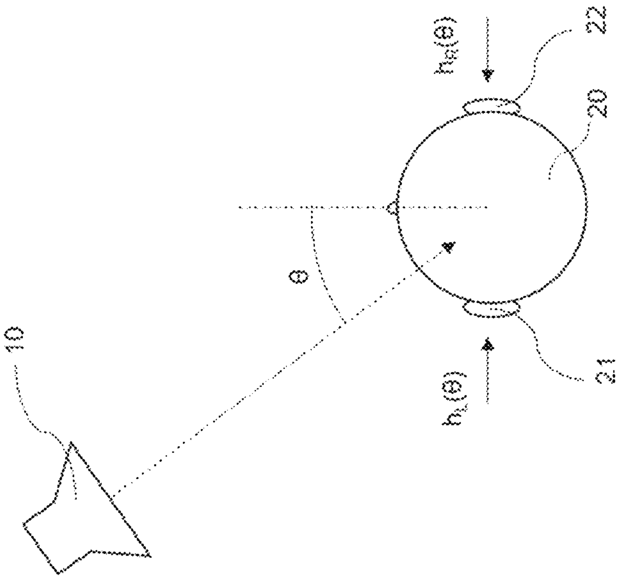
FIGS. 1A and 1B schematically illustrates HRTFs in the context of a real sound source offset from a user.

FIG. 1A schematically illustrates a first perspective of a head-related transfer functions (HRTFs) in the context of a real sound source 10 offset from a user 20.

As shown in FIG. 1A, the real sound source 10 is in front of and to the left of the user 20, at an azimuth angle θ in a horizontal plane relative to the user 20. The effect of positioning the sound source 10 at the angle θ can be modelled as a frequency-dependent filter hL(θ) affecting the sound received by the user's left ear 21 and a frequency-dependent filter hR(θ) affecting the sound received by the user's right ear 22. The combination of hL(θ) and hR(θ) is a head-related transfer function (HRTF) for azimuth angle θ.

More generally, the position of the sound source 10 can be defined in three dimensions (e.g. range r, azimuth angle θ and elevation angle φ), and the HRTF can be modelled as a function of three-dimensional position of the sound source 10 relative to the user 20.

Figure 1B:
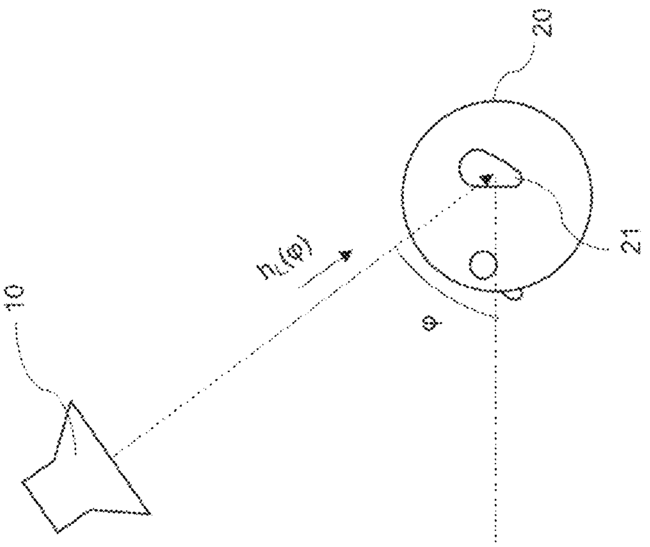

FIG. 1B shows the real sound source 10 of FIG. 1A from a second perspective, illustrating the real sound source 10 in front of the user 20 and raised above by an elevation angle cp.

As well as distance and direction, the perceived location of the sound source by a user is affected by several other parameters. These parameters can be classified into one of two categories: lateralisation or elevation. The lateralisation (or "width") of the sound source refers to the azimuthal sound direction, while the elevation of the sound source refers to the elevation (or "height") direction. Parameters may be classified based on whether their dominant contribution to the position of the sound source is to the perceived lateralisation or the perceived elevation of the sound source.

For example, the location of the first pinna notch (FPN) in the ipsilateral HRTF (i.e. the HRTF relating to the ipsilateral side of the user) affects the perceived elevation of the sound source. This is a parameter that varies from user to user and is based on the shape of the user's outer ear (pinna). The pinna features are contours of the ear shape which affect how sound waves are directed to the auditory canal. The length and shape of the pinna features affect which sound wavelengths are resonant or antiresonant with the pinna feature, and this response also typically depends on the position and direction of the sound source. The creation of these one or more resonances or antiresonances appear in the HRTF as spectral peaks or notches.

Moreover, the interaural time delay (ITD) is a first parameter predominantly affecting the perceived lateralisation of the sound source. The distance between the user's ears (also referred to as the "head width") causes a delay between sound arriving at one ear and the same sound arriving at the other ear, resulting in the interaural time delay. Other head measurements can also be relevant to hearing and specifically relevant to ITD, including head circumference, head depth and/or head height.

A second parameter that predominantly affects the perceived lateralisation of the sound source is the interaural level difference (ILD). The ILD arises due to the difference in intensity and frequency distributions of the sound received from the sound source by each ear. The ear closest to the sound source will detect a louder sound than the ear furthest away from the sound source due to dissipation of the sound as the sound wave travels.

The above-mentioned parameters affect the perceived position of a sound source and therefore one or more may be manipulated to alter this perceived position of the sound source. Parameters affecting our perception of a sound source are not limited to those mentioned above and may additionally comprise other parameters, for example, a second pinnae notch or timbre.

Figure 1C:
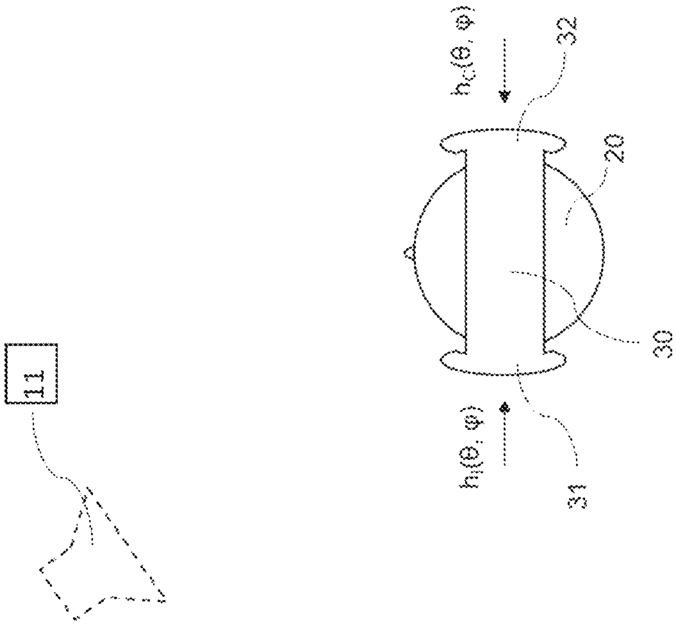
FIG. 1C schematically illustrates an equivalent virtual sound source offset from a user in audio provided by headphones.

FIG. 1C schematically illustrates an equivalent virtual sound source offset from a user in audio provided by headphones 30. In other words, the headphones 30 can be used to produce an audio signal which will simulate a sound source located at the same position as the real sound source 10. Herein "headphones" generally includes any device with an on-ear or in-ear sound source for at least one ear, including VR headsets and ear buds.

In FIG. 1C, the virtual sound source 11 is simulated to be at an azimuth angle θ, and an elevation angle φ relative to the user 20. In this example, the left side is the ipsilateral side (e.g. of the user 20 or the headphones 30 worn by the user 20). The virtual sound source 11 is simulated by incorporating the HRTF for a sound source at azimuth angle θ and elevation angle φ as part of the sound signal emitted from the headphones 30. More specifically, the sound signal from the left speaker 31 of the headphones 30 incorporates hI(θ, φ) and the sound signal from the right speaker 32 of the headphones incorporates hC(θ, φ). Additionally, inverse filters h-1I0 and h-1C0 may be applied to the emitted signals to avoid perception of the "real" HRTF of the ipsilateral and right speakers 31, 32 at their positions L0 and R0 close to the ears.

Figure 2:
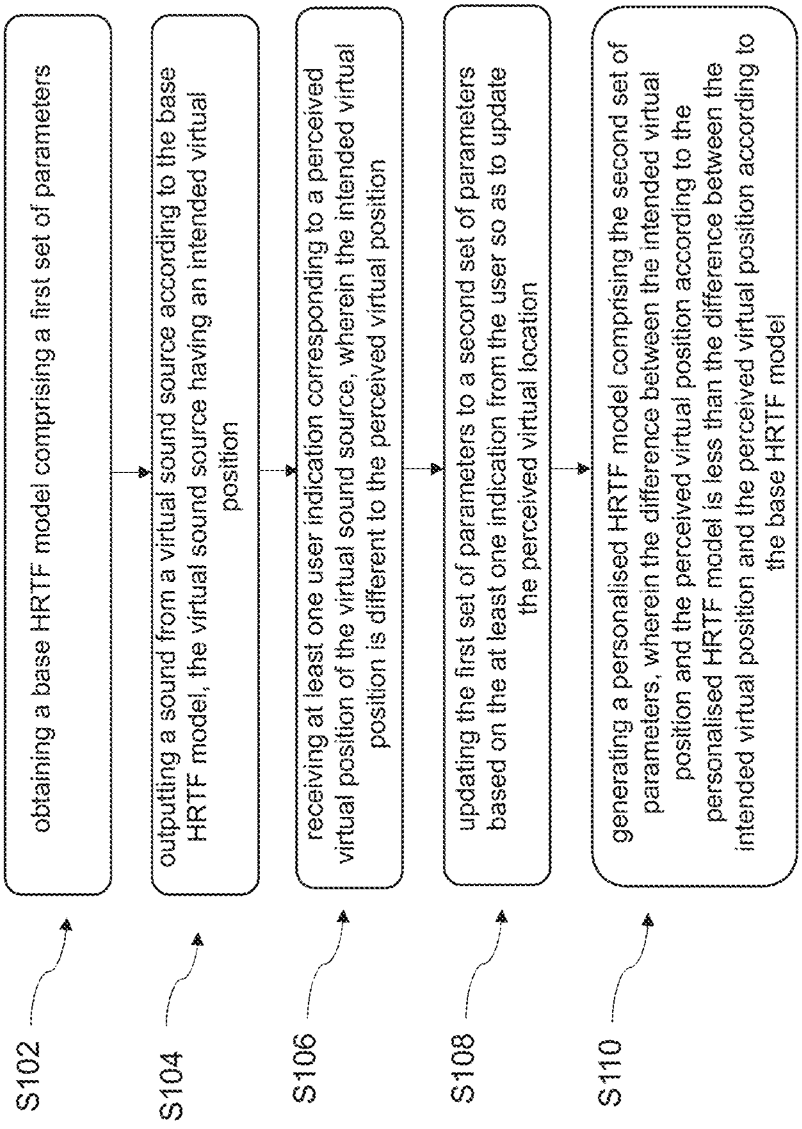
FIG. 2 schematically illustrates a method for generating a HRTF for an individual user.
Figure 3:
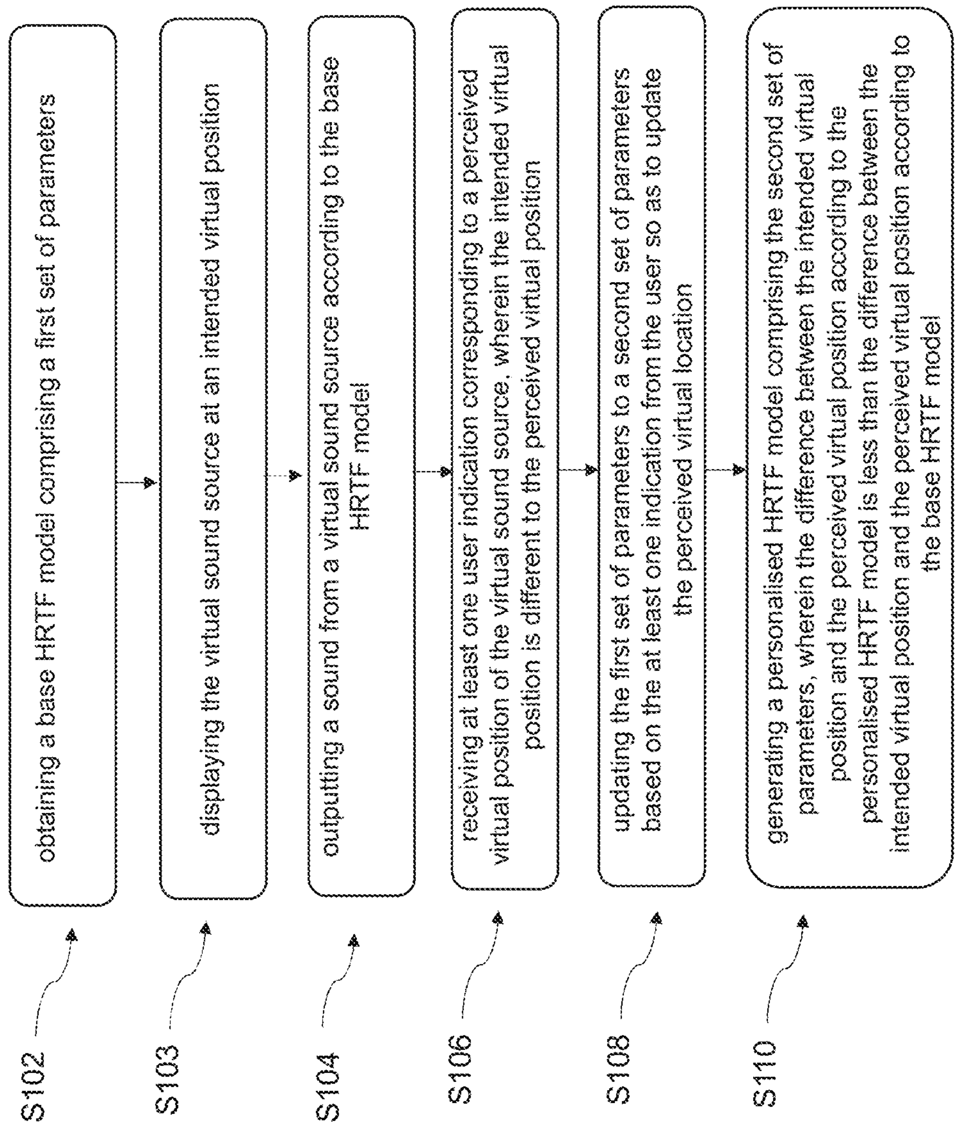
FIG. 3 schematically illustrates a method for generating a HRTF for an individual user.

FIG. 2 and FIG. 3 schematically illustrate exemplary methods for generating a personalised HRTF for an individual user. In this example, these methods are performed by an HRTF generator. The HRTF generator is implemented in the set of headphones 30. In alternate examples, a base unit is configured to communicate with the headphones and may be independent from the headphones. In other examples, the HRTF generator is implemented in an interactive audio-visual system such as a game console which is associated with the headphones 30. In another example, the HRTF generator is implemented in a server or cloud service. The HRTF generator may be implemented using a general-purpose memory and processor together with appropriate software. Alternatively, the HRTF generator may comprise hardware, such as an ASIC, which is specifically adapted to perform the method.

The method includes obtaining S102 a base HRTF model comprising a first set of parameters. The base HRTF model can be previously generated by the HRTF generator or can be generated by a separate device.

Each parameter of a HRTF model can indicate aspects of the audio filter in the HRTF model such as amplitude, Boolean existence of feature, frequency value, width of notch etc. . . . . Therefore, by altering a given parameter of the model, the above-mentioned components in the audio filter will change, thereby altering the perceived location of the sound source. An aim of the present invention is to move the perceived location of the sound source until it is in the same location or approximately the same location as the intended location of the sound source.

In one example, the first set of parameters match the intended virtual location with the perceived virtual location of the sound source for a "default user". In other words, a "default user" will perceive the sound source as being located at the intended location when the sound is played according to the base HRTF model.

The first set of parameters comprise the average value for each parameter for a sample of users. The parameters include a default FPN, a default ITD and/or a default ILD. For example, the default FPN is based on an average ear shape of the sample users, while the ITD is based on an average head width of the sample users. Using a base HRTF model comprising default parameter values will likely minimise the adjustments required to the parameters to personalise the HRTF model to suit an individual user.

In other examples, the base HRTF model may instead comprise a first set of parameters that are predicted to match the intended virtual location with the perceived virtual location for an individual user based on the individual user's physical features. The user inputs physical features that contribute to spectral features (e.g. pinnae notches) which may include the size, shape, and position of the user's head, ears, shoulders, torso, legs etc. In practice, this base HRTF model based on the user's features is likely to require fine-tuning by the user as the perceived location will likely not fully match with the intended location. Therefore, this model is set as the base HRTF model which will then be personalised using for example the following method.

A sound from a virtual sound source with an intended virtual position is output to the user S104, for example through the headphones 30. The sound is played according to the base HRTF model. In other words, the sound played to the user has filters as defined by the parameters of the base HRTF model. The sound source has an intended location and playing the sound according to the base HRTF model results in the sound being output as perceived by a default user, as discussed above. In reality, different users will perceive sound differently and so an actual user will not hear the sound exactly as it was intended. This results in the user hearing the sound from a perceived position of the sound source which is particular to that user and different to the intended position of the sound source. Playing a sound according to a base HRTF model provides a good starting point for personalising the HRTF model to the specific user so that their perception of the sound substantially matches the intended sound. The sound may be played to the user through the set of headphones 30 or by a base unit independent from the headphones. The sound may be a single burst of sound or may be a continuous output to the user.

To aid the user in understanding the intended virtual location of the sound source, the method comprises communicating S103, to the user, the intended virtual position of the virtual sound source. In this example, the communicating comprises displaying the virtual sound source at the intended virtual location.

The virtual sound source is displayed using a display screen. In other examples, the sound source may be displayed using a virtual reality headset or by using any other suitable visual aid. In this way, the user can visualise the intended location of the virtual sound source.

At least one user indication corresponding to a perceived virtual position of the virtual sound source is received S106. Since individual users have varying heights, ear shapes and head widths, the intended location of the sound source is generally different to the location the user perceives the virtual sound to originate from. As such, the intended virtual position is different to the perceived virtual position. The perceived virtual location indicated by the user comprises a perceived elevation angle ($\varphi$) position along the vertical axis which is different to the intended elevation angle ($\varphi$) position and/or a second perceived azimuthal angle ($\theta$) position in the horizontal plane which is different to the intended azimuthal angle ($\theta$).

In one example, the indication from the user is an active input via a user interface such as a game controller, keyboard, touchscreen, or voice command. Alternatively, the indication from the user may be passively input where the user is not aware they are providing user input indicating their perception of the sound source location. For example, the method may be used in combination with a virtual-reality headset including headphones and an eye-tracking mechanism. In this example, the headphones will output the sound and use the eye-tracking mechanism to determine where the user looks in response to the sound. If the user looks below the intended location of the sound source, then this is user input indicating the user perceives the sound source to be located below the intended location of the sound source. In such a case, the method may optionally comprise a step of receiving gaze tracking information relating to the user's gaze position. The gaze position may be determined with, or at a pre-determined time after, the outputting of the sound to the user. The step S106 may then comprise determining the perceived virtual location by interpreting the received gaze position of the user.

Based on the at least one indication from the user, the first set of parameters are updated to produce a second set of parameters S108. For example, the user may indicate that the perceived elevation is greater than the intended elevation of the sound source. The first set of parameters are updated by modifying one or more of the parameters. In one example, the first pinna notch value may be modified. This modified parameter is then included in the second set of parameters. In other examples, the second set of parameters may be generated by adding one or more additional parameters to the first set of parameters or by removing one or more parameters from the first set of parameters.

More than one indication corresponding to a perceived virtual position of the virtual sound source may be received from a user. As discussed, the aim of the method is to match the perceived location of the virtual sound source with the intended location of the virtual sound source. Therefore in order to accurately finetune the HRTF model to a user, the process of receiving a user indication related to the perceived location of the sound source and updating a set of parameters based on this, may be repeated until the user is satisfied that the perceived location matches the intended location. In this way, the set of parameters may be incrementally adjusted. For example, the first set of parameters may be updated to produce a second set of parameters as discussed above, the second set of parameters may be updated to produce a third set of parameters, the third set of parameters may be updated to produced a fourth set of parameters etc. The method of updating the set of parameters at each increment is the same as described above in relation to updating the first set of parameters.

Incrementally updating the set of parameters of the HRTF model is particularly advantageous in order to produce a personalised HRTF model. Once the user is satisfied that the intended and perceived locations are substantially the same, the last iteration of the updated set of parameters is set as final set of parameters to be used in the HRTF model.

A personalised HRTF model comprising the second set of parameters is generated S110. Where the personalised HRTF model comprises more than one iteration of parameter updating, the second set of parameters will be the final set of updated parameters in the series of iterations. In one example, the personalised HRTF model comprises synthesising the personalised HRTF model in real-time.

In some examples, the personalised HRTF is selected from a database of HRTF models. For example, a set HRTF models with parameters defining perceived sound source positions are stored in a HRTF database. This includes various positions spaced across a range of azimuth angles and/or a range of elevation angles. The generated personalised HRTF model comprises the HRTF model from the table with the perceived elevation and perceived lateralisation that closest matches the indication(s) from the user. One exemplary HRTF database comprises 49 HRTF models, with a 7×7 matrix of lateral and elevation values.

The base HRTF may be generated on the same or a separate computer device to the personalised HRTF. For example, while the personalised HRTF may be generated by a personal user device, the default HRTF may be generated once by an organisation providing a personalised HRTF service to multiple users.

Figure 4A:
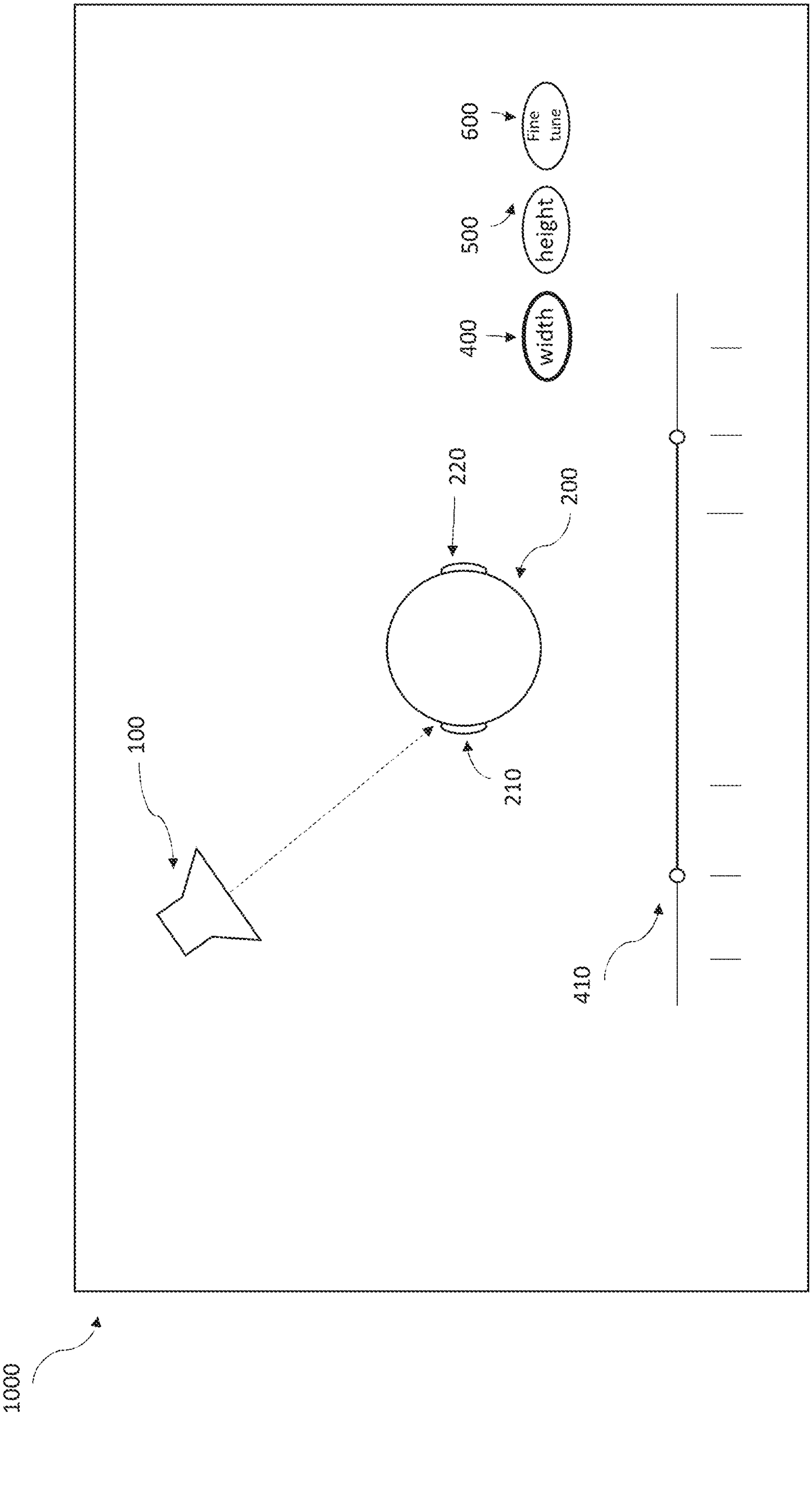
FIG. 4A schematically illustrates an exemplary display screen.
Figure 4B:
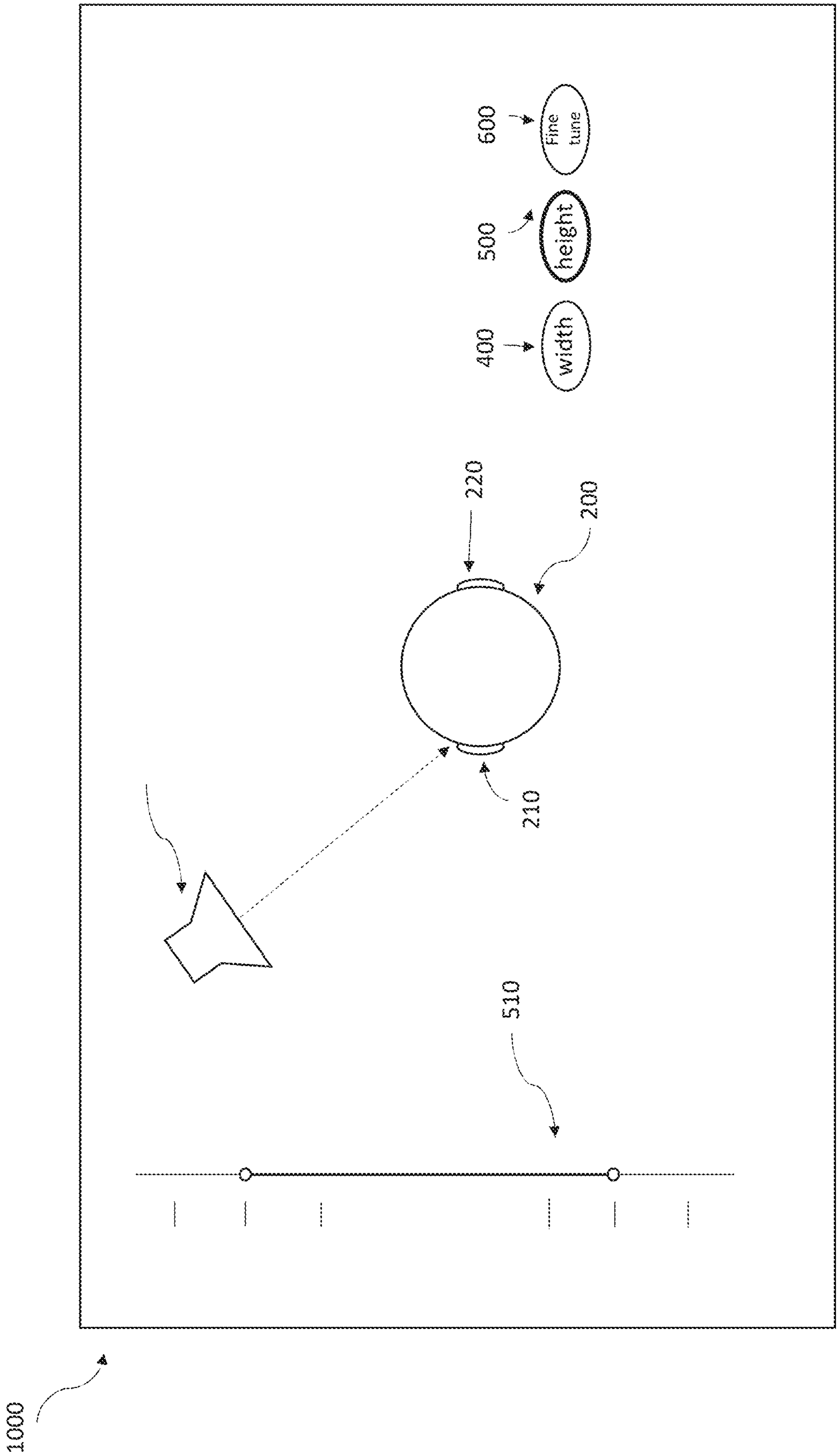
FIG. 4B schematically illustrates another exemplary display screen.

FIG. 4A and FIG. 4B schematically illustrate an exemplary display screen which is used to display the virtual sound source in three-dimensional (3D) space to the user. The audio-visual system 1000 is a game console associated with the HRTF generator. In other examples, the game console is in communication with the HRTF generator.

The audio-visual system 1000 is displaying an icon associated with the virtual sound source. In this example, the icon is an image of a speaker 100. In other examples, any suitable icon representing a sound source can be used. The speaker 100 is shown on the display to be located at the intended location. The speaker 100 is shown to be "radiating" in order to indicate that a sound is intended to originate from the intended location. Alternatively, there may be a single line or arrow indicating a direction of sound towards the user.

A coordinate system (not shown in the figures) including an x-axis, a y-axis and/or a z-axis can be shown on the display screen to indicate to the user that the speaker 100 is located in 3D space. A user's head icon 200 is displayed to indicate their intended location relative to the speaker 100. The user's head icon 200 is located at the (0,0,0) coordinate of the coordinate system.

The audio-visual system 1000 aids in receiving an accurate indication from the user of the perceived location of the sound source. Icons associated with the lateralisation 400, the elevation 500 and fine tuning 600 may be displayed on the display screen, allowing a user to select, by a user interface, which of these factors require altering.

A slider 410, 510 is shown to be displayed to the user. Using the user interface, the slider 410, 510 can be adjusted by the user. By adjusting the slider 410, 510, the user is indicating a perceived location of the sound source. The slider can be used to indicate that the perceived sound source needs moving by a specified amount in order to match more closely with the intended location.

For example, the width slider 410 may be divided into discrete lateral values such that it will "jump" between set discrete width values as the user moves the slider 410. Likewise, the height slider 510 may jump between a set of discrete elevation values. This is particularly advantageous when generating the personalised HRTF from a database of HRTF models as the sliders only allow the user to select values that are stored in the database.

Alternatively, at least one of the sliders 410, 510 may be a continuous slider. In this way, the indication from the user may comprise a large range of elevation angles and/or azimuthal angles. This is advantageous, for example, when the HRTF is synthesised in real-time.

The sliders 410, 510 may have a scale associated with them. As shown in FIGS. 4A and 4B the scale may be arbitrary with no values or may have arbitrary values such as 1, 2, 3. Alternatively, the values may indicate the azimuthal or elevation angle to the user.

When the user inputs an indication using the sliders, the first set of parameters will be updated in any of the above described ways. This updating may occur a plurality of times (i.e. each time the user moves the slider) until the user is satisfied that the perceived sound location matches the intended sound location. At each iteration of updating the first set of parameters, the sound may be played to the user before another indication is made. Once the user is satisfied with the perceived location, the personalised HRTF model is generated comprising the second set of parameters, which are the parameters of the last iteration of the first set of parameters.

The invention claimed is:

1. An audio personalisation method for generating a personalised Head-Related Transfer Function (HRTF) comprising:

communicating an intended virtual position of a virtual sound source to a user by displaying the virtual sound source at the intended virtual position;

receiving at least one user indication corresponding to a user virtual position of the virtual sound source, wherein the intended virtual position is different to the user virtual position;

updating a first set of parameters of a base HRTF model to a second set of parameters based on the at least one user indication so as to update the user virtual position; and generating a personalised HRTF model comprising the second set of parameters, wherein the difference between the intended virtual position and the user virtual position according to the personalised HRTF model is less than the difference between the intended virtual position and the user virtual position according to the base HRTF model, wherein the intended virtual position comprises an intended virtual elevation position and the user virtual position comprises a user virtual elevation position, and wherein the difference between the intended virtual elevation position and the user virtual elevation position according to the personalized HRTF model is less than the difference between the intended virtual elevation position and the user virtual elevation position according to the base HRTF model.

2. The method of claim 1 wherein the intended virtual position comprises an intended virtual lateral position and the user virtual position comprises a user virtual lateral position, and wherein the difference between the intended virtual lateral position and the user virtual lateral position according to the personalised HRTF model is less than the difference between the intended virtual lateral position and the user virtual lateral position according to the base HRTF model.

3. The method of claim 2, wherein a parameter of at least one of the first or second sets of parameters comprises:

an interaural time delay;

an interaural level difference; or a first pinna notch.

4. The method of claim 3 wherein updating the first set of parameters to the second set of parameters comprises updating at least one of the interaural time delay or the interaural level difference to reduce a difference between the intended virtual lateral position and the user virtual lateral position.

5. The method of claim 3 wherein updating the first set of parameters to the second set of parameters comprises updating the first pinna notch to reduce a difference between the intended virtual elevation position and the user virtual elevation position.

6. The method of claim 1 wherein updating the first set of parameters to the second set of parameters comprises at least one of:

adding a parameter to the first set of parameters to generate the second set of parameters;

removing a parameter from the first set of parameters to generate the second set of parameters; or modifying a parameter of the first set of parameters to generate the second set of parameters.

7. The method of claim 1 wherein updating the first set of parameters to the second set of parameters comprises incrementally updating the first set of parameters n times to an nth set of parameters, wherein the nth set of parameters becomes the second set of parameters.

8. The method of claim 7 wherein a plurality of user indications are received and wherein each incremental update of the first set of parameters is based on a respective user indication from the plurality of user indications.

9. The method of claim 1 wherein generating a personalised HRTF model comprises selecting a HRTF model from a database of HRTF models.

10. The method of claim 1 wherein generating a personalised HRTF model comprises synthesising the personalised HRTF model in real-time.

11. The method of claim 1, wherein the virtual sound source is displayed on a display screen.

12. The method of claim 1, further comprising:

obtaining the base HRTF model comprising the first set of parameters; and outputting a sound from the virtual sound source according to the base HRTF model, the virtual sound source having the intended virtual position.

13. A system for generating a personalised head related transfer function (HRTF) comprising:

an HRTF generator configured to:

communicate an intended virtual position of a virtual sound source to a user by displaying the virtual sound source at the intended virtual position;

receive at least one user indication corresponding to a user virtual position of the virtual sound source, wherein the intended virtual position is different to the user virtual position;

update a first set of parameters of a base HRTF model to a second set of parameters based on the at least one user indication so as to update the user virtual position; and generate a personalised HRTF model comprising the second set of parameters, wherein the difference between the intended virtual position and the user virtual position according to the personalised HRTF model is less than the difference between the intended virtual position and the user virtual position according to the base HRTF model, wherein the intended virtual position comprises an intended virtual elevation position and the user virtual position comprises a user virtual elevation position, and wherein the difference between the intended virtual elevation position and the user virtual elevation position according to the personalized HRTF model is less than the difference between the intended virtual elevation position and the user virtual elevation position according to the base HRTF model.

14. The system of claim 13 further comprising a displaying unit configured to display the virtual sound source to a user at an intended virtual location.

15. The system of claim 13 wherein the intended virtual position comprises an intended virtual lateral position and the user virtual position comprises a user virtual lateral position, and wherein the difference between the intended virtual lateral position and the user virtual lateral position according to the personalised HRTF model is less than the difference between the intended virtual lateral position and the user virtual lateral position according to the base HRTF model.

16. The system of claim 15, wherein a parameter of at least one of the first or second sets of parameters comprises:

an interaural time delay;

an interaural level difference; or a first pinna notch.

17. The system of claim 16 wherein updating the first set of parameters to the second set of parameters comprises one of:

updating at least one of the interaural time delay or the interaural level difference to reduce a difference between the intended virtual lateral position and the user virtual lateral position; or updating the first pinna notch to reduce a difference between the intended virtual elevation position and the user virtual elevation position.

18. The system of claim 13, wherein the HRTF generator is configured to:

obtain the base HRTF model comprising the first set of parameters; and output a sound from the virtual sound source according to the base HRTF model, the virtual sound source having the intended virtual position.

* * * * *